(12) United States Patent
Wen et al.

(10) Patent No.: US 6,669,914 B1
(45) Date of Patent: Dec. 30, 2003

(54) INTERNAL COMBUSTION ENGINE HAVING A CATALYTIC REACTOR

(75) Inventors: Chaur S. Wen, San Diego, CA (US); Peter B. Roberts, Encinitas, CA (US)

(73) Assignee: Solar Turbines Inc, San Diego, CA (US)

(*) Notice: Subject to any disclaimer, the term of this patent is extended or adjusted under 35 U.S.C. 154(b) by 0 days.

(21) Appl. No.: 09/569,798

(22) Filed: May 12, 2000

Related U.S. Application Data

(62) Division of application No. 09/085,725, filed on May 27, 1998, now Pat. No. 6,098,396.

(51) Int. Cl.[7] .............................. F23R 3/40; F02C 7/26
(52) U.S. Cl. ...................... 422/180; 422/173; 422/177; 60/39.12; 60/723; 60/777
(58) Field of Search ................................ 422/170–171, 422/173, 177, 180, 222; 60/272, 282, 303, 777, 723, 39.12

(56) References Cited

U.S. PATENT DOCUMENTS

| | | | |
|---|---|---|---|
| 4,567,857 A | * 2/1986 | Houseman et al. ......... 123/1 A |
| 5,441,706 A | * 8/1995 | Whittenberger ............. 422/180 |
| 5,512,250 A | * 4/1996 | Betta et al. ................. 422/180 |
| 5,846,494 A | * 12/1998 | Gaiser ........................ 422/180 |
| 6,109,018 A | * 8/2000 | Rostrup-Nielsen et al. ... 60/723 |

* cited by examiner

Primary Examiner—Hien Tran
(74) Attorney, Agent, or Firm—Keith P Roberson

(57) ABSTRACT

Internal combustion engines produce a number of emissions including oxides of nitrogen, NOx. One manner of reducing NOx production used in gas turbine engines is through the use of catalytic reactors. Catalytic reactors reduce the ignition temperatures required for complete combustion of a fuel air mixture. However, high temperatures present in catalytic reactors cause sintering of the substrate, vaporization of the catalyst, and sintering of catalyst and metal substrate. The present invention is directed at controlling the temperature of a catalytic reactor in an internal combustion engine. An exothermic catalyst coats a first side of a substrate in the catalytic reactor. An endothermic catalyst coats a second side of the substrate.

8 Claims, 5 Drawing Sheets

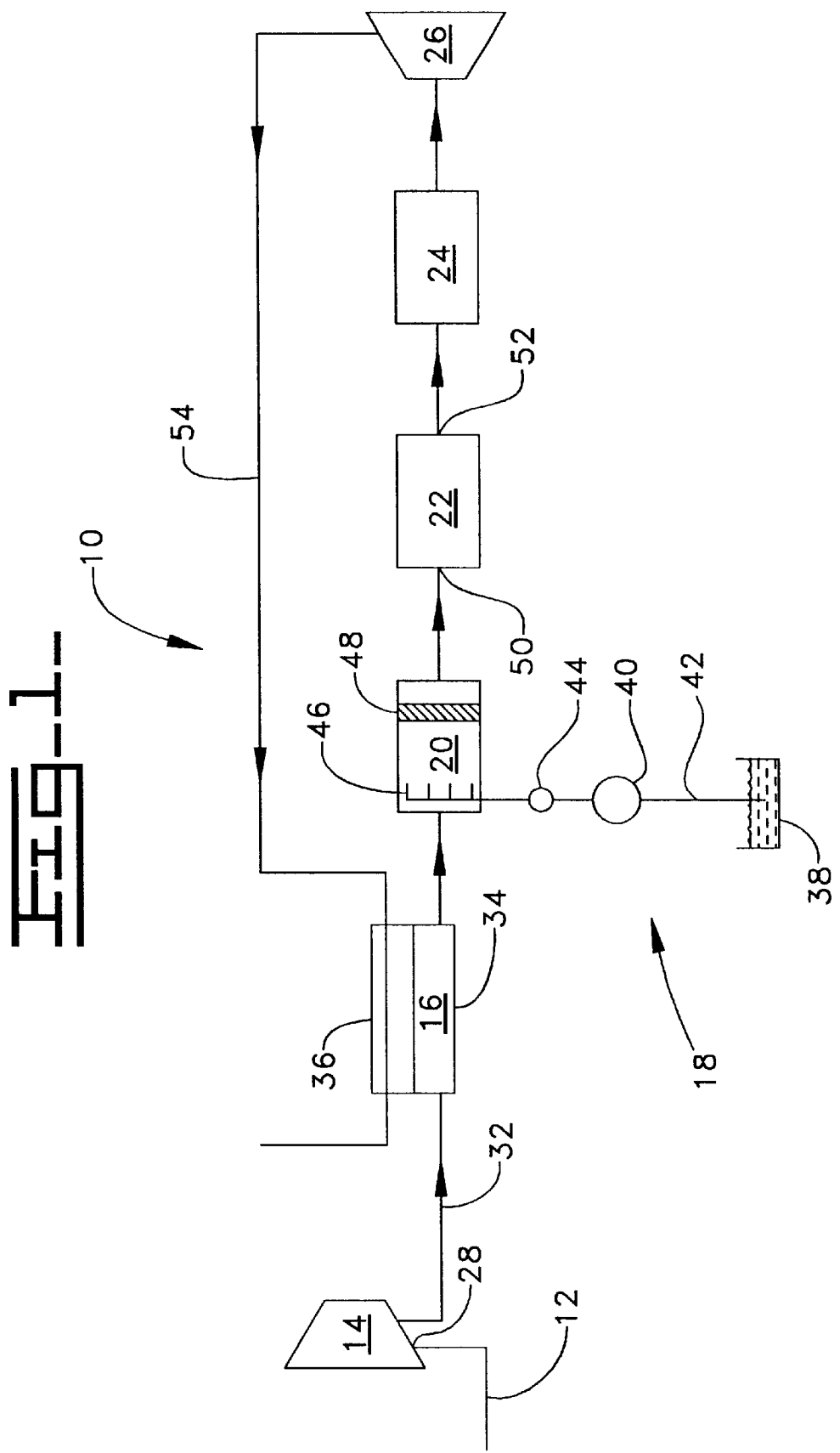

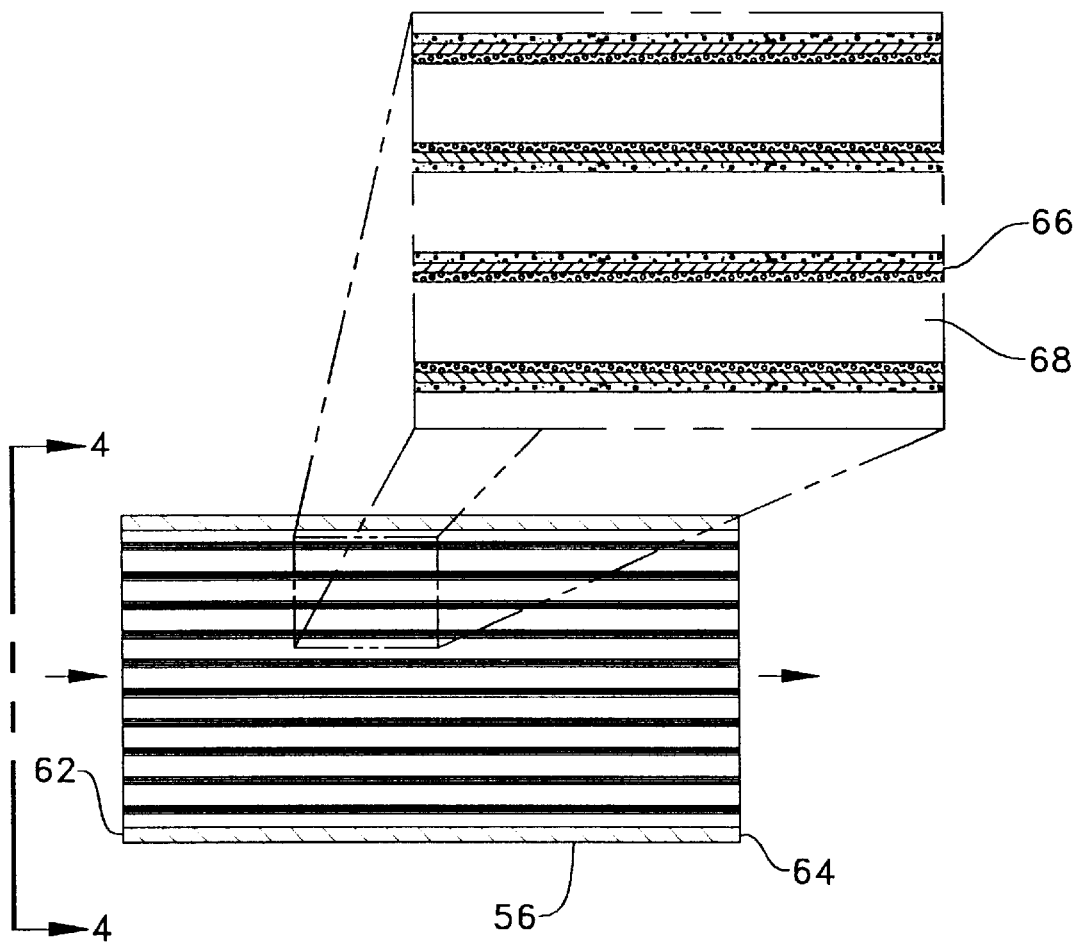

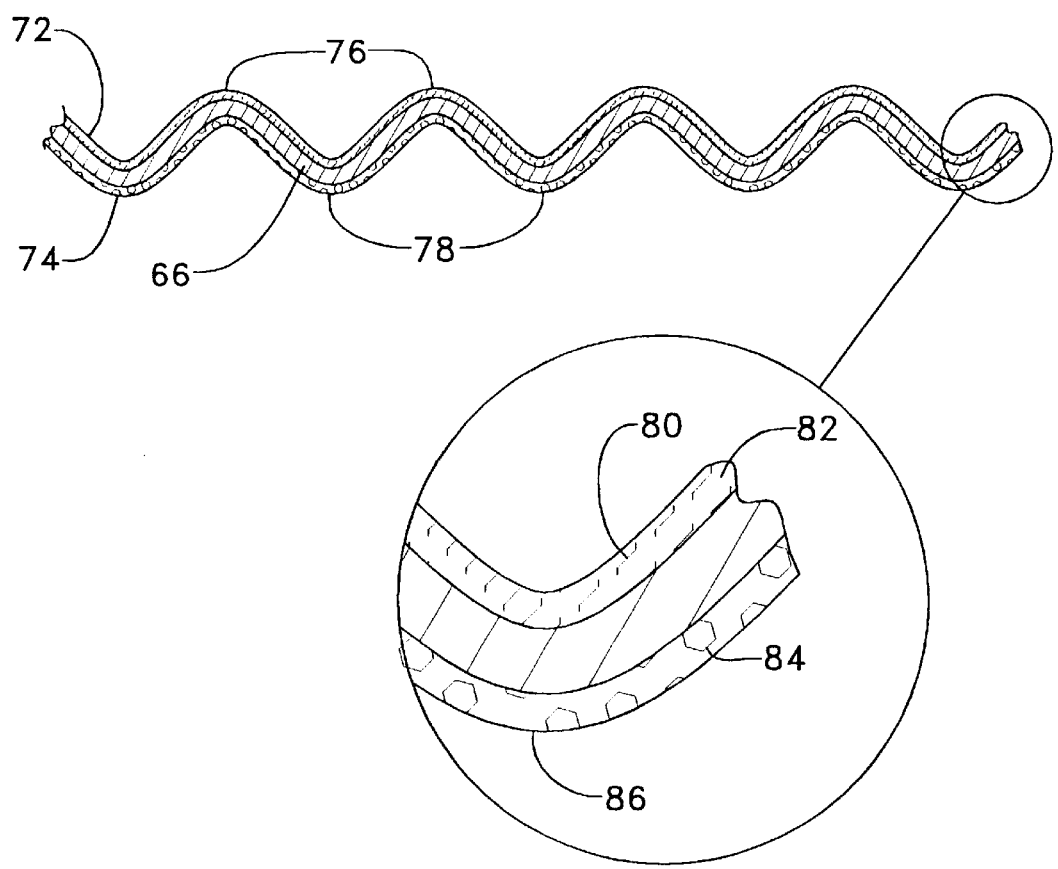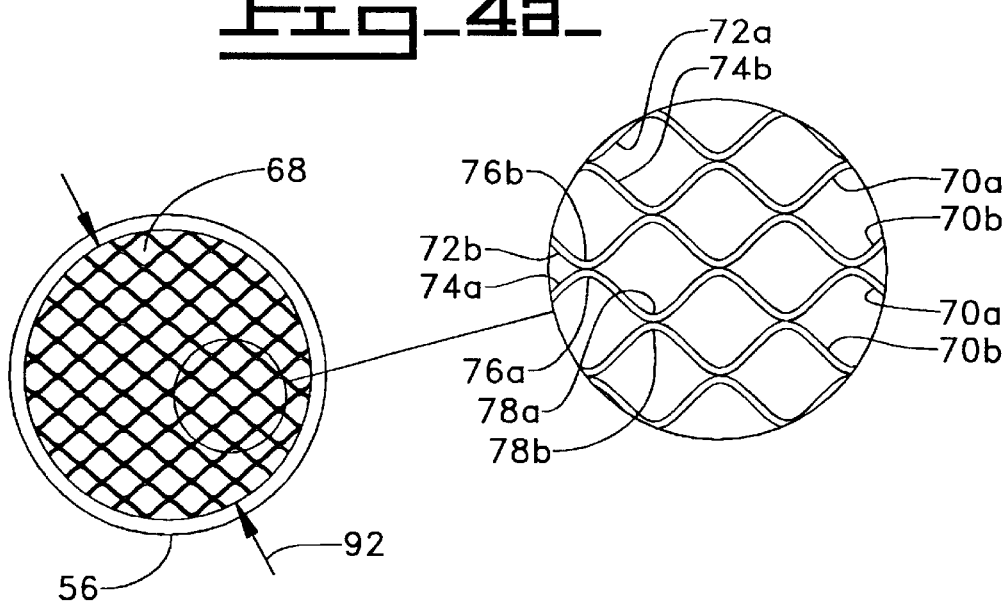

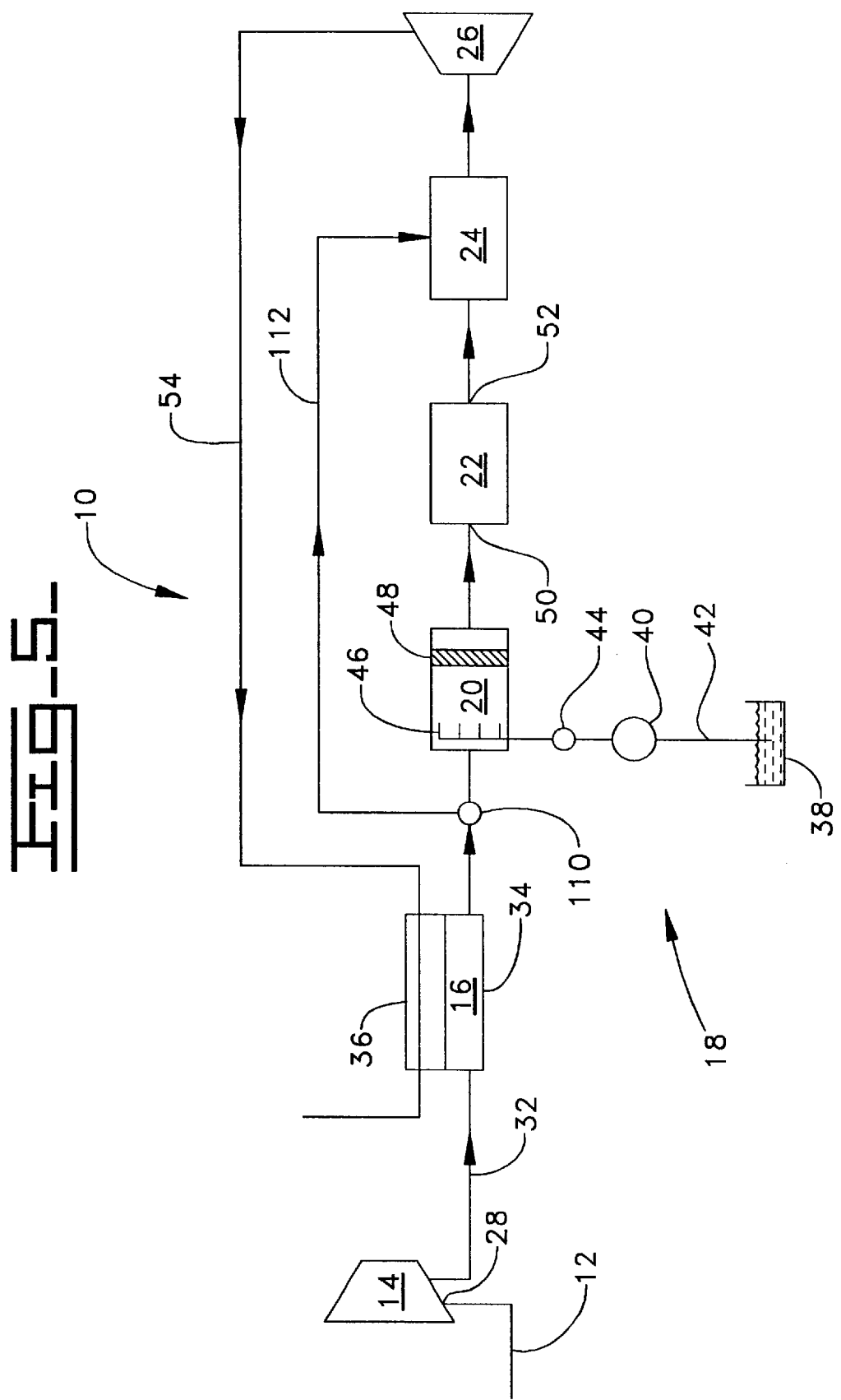

INTERNAL COMBUSTION ENGINE HAVING A CATALYTIC REACTOR

This is a divisional application of application Ser. No. 09/085725, filed May 27, 1998, now U.S. Pat. No. 6,098,396.

TECHNICAL FIELD

This invention relates generally to an internal combustion engine and more specifically to operating a catalytic reactor in the internal combustion engine.

BACKGROUND ART

The use of fossil fuel in gas turbine engines results in combustion products in the exhaust consisting of carbon dioxide, water vapor, oxides of nitrogen, carbon monoxide, unburned hydrocarbons, oxides of sulfur, and particulates of these above products, carbon dioxide and water vapor are generally not considered objectionable.

Regulations on the remainder of emissions continue to promote innovation among engine manufacturers and researchers. Manufacturers have reduced many of the combustion products through design modifications, improved fuels, or additional hardware. Many of these changes have improved efficiencies in the engine.

However, many of these same changes have increased the production of NOx. NOx is formed by oxidation of atmospheric nitrogen. The rate of NOx production depends mostly on a temperature of combustion and to some degree upon a concentration of reactants. Consequently, a small reduction in the temperature of combustion results in significant reductions in NOx production.

Automotive engine manufacturers use exhaust gas recirculation as one method of reducing the temperatures of combustion. Exhaust gas recirculation involves replacing a volume of inlet air with combustion products. By reducing the excess oxygen, combustion proceeds at a slower rate and reduces temperatures of combustion. Additionally, less oxygen is available for oxidation of atmospheric nitrogen. While exhaust gas recirculation generally reduces the production of NOx, it also reduces the available power and generally increases fuel consumption.

Another method of controlling NOx involves injecting water or steam to reduce the temperature of combustion. This method increases cost due to additional equipment, such as pumps, lines, and a storage reservoir. Furthermore, the cost of supplying water may be cost prohibitive. In mobile applications, water further reduces efficiency by increasing the weight of the vehicle.

In a gas turbine, increasing a flow of air into a combustor reduces the temperature of combustion. This method increases excess oxygen available to oxidize atmospheric nitrogen while at the same time reducing the temperature of combustion. However, increasing the flow of air to a combustion zone tends to quench combustion causing the engine to operate unevenly. By using a low ignition temperature fuel, greater air to fuel ratios may be achieved without quenching combustion.

In U.S. Pat. No. 4,567,857 issued to Houseman et al. on Feb. 4, 1986, a fuel is reformulated in a catalytic reactor to form the low ignition temperature fuel. This invention uses exhaust gas to heat the catalyst. However, catalytic reactors only need exhaust heat for initial operation. Once operating, catalytic reactors may reach extreme temperatures nearing adiabatic flame temperatures. These high temperatures lead to vaporization of active catalyst components, sintering of the catalyst and the substrate, thermal shock of metal substrate, and fracturing of metal substrate.

In U.S. Pat. No. 5,512,250 issued to Betta et al on Apr. 30, 1996, a monolithic catalyst structure has a palladium catalyst on a first side of a substrate. A portion of the fuel air mixture is passed along a second side of the substrate to control the temperature of the substrate. The first side employs a tortuous flow path to place the flow in the greatest contact with the catalyst, and the second side is designed to maintain high flow rates which aid in cooling the substrate. This system results in reduced overall pressures and temperatures of a fuel/air mixture exiting the catalyst structure. The reduced temperatures of the fuel/air mixture limits the volume of air that may be introduced to the combustor without making the flame unstable.

The present invention is directed at overcoming one or more of the problems set forth above.

DISCLOSURE OF THE INVENTION

In one aspect of the present invention an internal combustion engine comprises an air inlet connected with a catalytic reactor having an inlet and an outlet. The catalytic reactor has a housing containing a thermally conductive substrate. The substrate has a first side and a second side. The first side is treated with an exothermic catalyst adapted to promote a partial catalytic combustion process of a fuel. The second side is treated with an endothermic catalyst adapted to promote cracking or reformation of the fuel. The substrate defines a network of longitudinal passages through the housing. A heating device connected between air inlet and the catalytic reactor inlet increases an air stream temperature above a temperature needed to sustain the catalytic combustion. A fuel delivery device connects between the air inlet and the catalytic reactor inlet. A combustor has an inlet and an outlet where the inlet of the combustor connects with the catalytic reactor outlet.

In another aspect of the present invention, a method of operating an internal combustion engine to reduce emissions comprises the steps of heating an air stream to a temperature above a catalytic temperature needed to sustain a catalytic combustion process. Fuel is mixed with the air stream to form a fuel/air mixture. The fuel/air mixture is exposed to a catalytic reactor having a substrate. The substrate has a first side and a second side that are thermally connected. A first portion of the fuel/air mixtures is partially combusted generating heat and a first catalytic exhaust mixture. The heat is transferred from the first side to the second side. A second portion of the fuel/air mixture is catalytically cracked or reformed on the second side of the substrate using the heat. The catalytic cracking forms a second catalytic exhaust mixture. The first catalytic exhaust mixture and the second catalytic exhaust mixture mix to form a combustible gas. The combustible gas is then combusted.

In another aspect of the invention, a method of making a catalytic reactor for use on an internal combustion engine, comprises forming a first foil having a plurality of first corrugations. The first foil has a first side and a second side. The first side of the first foil is treated with an exothermic catalyst and a first washcoat. The second side of the first foil is treated with an endothermic catalyst and a second washcoat. A first separating plate is formed having a first side and a second side. The first side of the first separating plate is treated with the exothermic catalyst and the first washcoat. The second side of the first separating plate is treated with the endothermic catalyst and the second washcoat. A second separating plate is formed having a first side and a second side. The first side of the second separating plate is treated with the exothermic catalyst and the first washcoat. The second side of the second separating plate is treated with the endothermic catalyst and the second washcoat. A second foil is formed having a second plurality of corrugations, a first side, and a second side. The first side of the second foil is treated with the exothermic catalyst and the first washcoat. The second side of the second foil is treated with the endothermic catalyst and the second washcoat. A stack is formed by attaching the first side of the first foil to the first side of the first separating plate, attaching the second side of the first foil to the second side of the second separating plate, attaching the first side of the second foil to the first side of the second separating plate. The stack is then rolled to form a cylinder wherein the second side of the first separating plate faces the second side of said second foil. The cylinder is then positioned in a housing.

BRIEF DESCRIPTION OF THE DRAWINGS

FIG. 1 is a schematic view of an internal combustion engine embodying the present invention;

FIG. 2 is a side view of a catalytic reactor;

FIG. 3 is one expanded view of a substrate;

FIG. 4a is a frontal view of the catalytic reactor taken along line 4—4 of FIG. 1;

FIG. 5 is a schematic of the internal combustion engine embodying the present invention with a flow diversion device.

BEST MODE FOR CARRYING OUT THE INVENTION

Figure 4B:
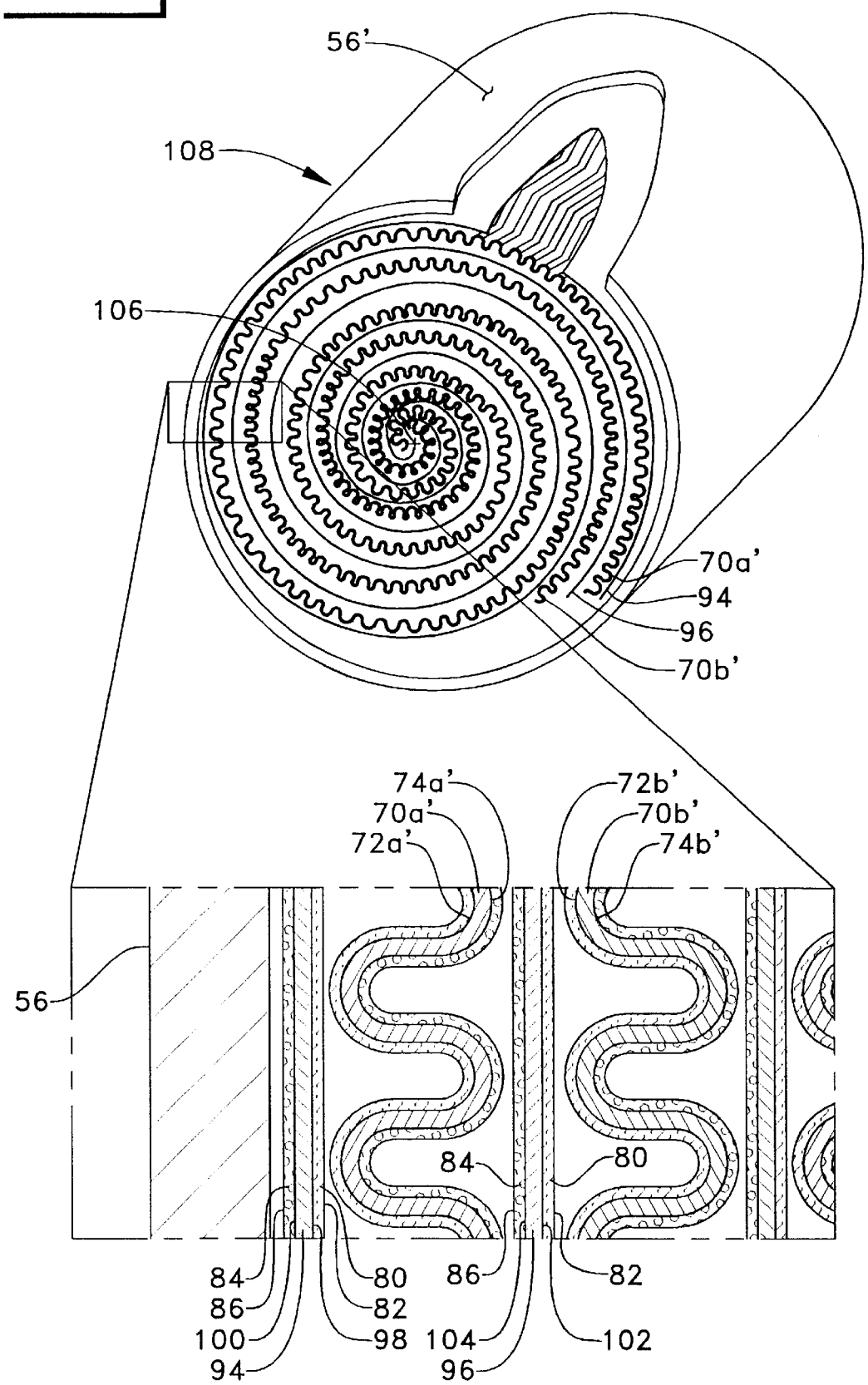
FIG. 4b is a frontal view of another embodiment of the catalytic reactor.

FIG. 1 shows an internal combustion engine 10 which in this application is a gas turbine engine having an air inlet 12, a compressor 14, a recuperator 16, a fuel supply system 18, a mixing chamber 20, a catalytic reactor 22, a combustor 24, and a turbine 26. The air inlet 12 is connected to the compressor inlet 28. A compressed air conduit 32 connects the compressor 14 to the recuperator 16. Other heating devices including burners, electric heaters, water jackets, or other types of heat exchange devices might also be used in combination or as a substitute for the recuperator 16. The recuperator 16 defines a recipient side 34 and a donor side 36. The compressed air conduit 32 connects with the recipient side 34 of the recuperator 16. The mixing chamber 20 connects with the recipient side 34 of the recuperator 16 downstream from the compressed air conduit 32. While the present embodiment shows the mixing chamber 20 as a dedicated part of the engine 10, it should be understood that mixing of a fuel may occur anywhere upstream of the catalytic reactor. In the preferred embodiment, the recuperator 16 is placed upstream of the introduction of the fuel, but the recuperator 16 might also be placed after introduction of fuel especially in the case of gaseous fuels.

The mixing chamber 20 receives a fuel from the fuel supply system 18 having a fuel reservoir 38, a fuel pump 40, a fuel line 42, and a fuel injector 44. The fuel line 42 connects the fuel reservoir 38, containing a gaseous fuel or a liquid hydrocarbon fuel having a low octane number, to the fuel pump 40. However, the fuel pump 40 may be optional if the fuel is already pressurized or the fuel pump 40 is incorporated into the fuel injector 44. The fuel line 42 connects the fuel pump 40 to the fuel injector 44. The fuel injector 44 defines a plurality of spokes 46 positioned to deliver fuel to the mixing chamber 20. It should be understood that fuel injectors 44 represent only one method of controlling the introduction of fuel into the mixing chamber 20. Other types of control valves and/or devices to enhance mixing of fuel with air may also be used. Optionally, the mixing chamber 20 may contain one or more mixers 48 of conventional construction.

An inlet 50 of the catalytic reactor 22 connects with the mixing chamber 20. An outlet 52 of he catalytic reactor 22 is connected to the combustor 24 and produces a reformulated fuel/gas mixture. The combustor 24 is fluidly connected to the turbine 26. The turbine 26 is connected with the compressor 14 in an ordinary manner including a shaft or other driving mechanism (not shown). An exhaust conduit 54 fluidly connects the turbine 26 the donor side 36 of the recuperator 16.

As shown in FIG. 2, the catalytic reactor 22 has a housing 56. In the preferred embodiment, the housing has a cylindrical shape. The housing defines a first end 62 and a second end 64. The first end 62 connects with the mixing chamber 20. The second end 64 connects with the combustor 24. The housing 56 is made of a material resistant to corrosion or deformation at temperatures above 1850° F. (1010° C.). A substrate 66 is positioned in the housing 56 of the catalytic reactor 22. The substrate 66 defines a network of longitudinal passages 68 through)ay catalytic reactor 22.

FIG. 3 shows a corrugated, thin metallic foil 70 having a first side 72, a second side 74, crests 76, and troughs 78. The substrate 66 is preferably made from an aluminum/chromium-containing steel alloy. However, other materials being malleable, having high conductivity, and having high temperature corrosion resistance may also be used. The first side 72 of the foil 70 is coated with an exothermic catalyst 80, preferably a palladium based combustion catalyst, and a first washcoat 82. In the preferred embodiment, the first washcoat 82 is $ZrO_2$. The second side 74 of the foil 70 is coated with an endothermic catalyst 84, preferably a nickel or a transition metal (i.e. iridium, ruthenium, rhodium) based catalyst and having a second washcoat 86. The second washcoat 86 is preferably alumina. A chromium based catalyst will also work with the alumina washcoat on the second side 74. In the preferred embodiment, each catalyst 80, 84 is mixed with the respective washcoat 82, 86 and applied to the proper side 72, 74 of the foil 70.

FIG. 4a shows the network of longitudinal passages 68 being formed alternately stacking a first foil 70a on top of a second foil 70b where "a" and "b" indicate orientation during stacking. A first side 72a of the first foil 70a attaches to a second side 74b of the second foil 70b. A second side 74a of the first foil 70a attaches to a first side 72b of the second foil 70b. A corresponding crest 76a of the first foil 70a attaches to a corresponding crest 76b of the second foil 70b. A corresponding trough 78a of the first foil 70a attaches to a corresponding trough 78b of the second foil 70b. In the preferred embodiment, the catalytic reactor 22 has eighty percent openness of a pre-established flow area of the housing 56 defined by a hydraulic circumference 92.

In another embodiment, FIG. 4b shows the network of longitudinal passages 68' being serpentine with the (') representing like elements. In the preferred embodiment, the network of longitudinal passages 68' is formed using the first foil 70a', the second foil 70b', a first separating plate 94, and a second separating plate 96. The first separating plate 94 and the second separating plate 96 are made from a material resistant to corrosion or deformation at temperatures above 1850° F. (1010° C.) and are thermally conductive. In the preferred embodiment, the first separating plate 94 and the second separating plate 96 are made of an aluminum/chromium containing steel. The network of longitudinal passages 68' is formed by positioning the first side 72a' of the first foil 70a' atop a first separating plate 94 on a first side 98. The first side 98 of the first separating plate 94 is coated with the exothermic catalyst 80 and the first washcoat 82. A second side 100 of the first separating plate 94 is coated with the endothermic catalyst 84 and the second washcoat 86. The second side 100 of the first separating plate 94 is positioned atop the second side 74b' of the second foil 70b'. The second separating plate 96 has a first side 102 and a second side 104. The first side 102 of the second separating plate 96 is treated with the exothermic catalyst 80 and the first washcoat 82. The second side 104 of the second separating plate 96 is treated with the endothermic catalyst 84 and the second washcoat 86. The first side 102 of the second separating plate 96 is positioned below the second side 74b' of the second foil 70b'. The first and second foils 70a', 70b' and separating plates 94,96 are then rolled into a cylinder 108 spiraling to a center 106. The cylinder 108 is positioned in the housing 56. Instead of using the foils 70, the network of longitudinal passages 68 could be cast, formed, machined, or otherwise shaped by the substrate 66.

In another embodiment, FIG. 5 shows a flow diverter valve 110 connected with both the recipient side 34 of the recuperator 16 and the mixing chamber 20. The flow diverter valve 110 may also be connected anywhere upstream of the mixing chamber 20. A dilution air conduit 112 connects the flow diverter valve 110 with the combustor 24.

Industrial Applicability

Catalytic reactors 22 present a useful tool in reducing the amount of NOx production in the combustion process by generating hydrogen-rich reformed fuels or converting low octane fuel into higher octane fuels. These hydrogen-rich reformed fuels or higher octane fuels allow gas turbine engines 10 to operate using a larger volume of dilution air to reduce NOx production. Enhancing heat transfer within the catalytic reactor 22 using the endothermic catalyst 84 and the exothermic catalyst 80 prolongs and improves the effectiveness of the catalytic reactor 22.

In the preferred embodiment, fresh air enters the air inlet 12 connected to the compressor inlet 28. Compressed air exits the compressor 14 at temperatures below those needed for the activation of the catalytic reactor 22. Compressed air passes through the recuperator 16 to increase the temperature to the desired range. In the recuperator 16, energy, in the form of heat, from the expanded gas, exhaust, on the donor side 36 is transferred to the compressed air on the recipient side 34. In the preferred embodiment heated, compressed air leaving the recuperator 16 exceeds 650 degrees F. (343 degrees C.), but actual temperatures of the compressed air leaving the recipient side 34 of the recuperator 16 will vary depending on the particular engine 10 and recuperator 16. Other internal combustion engines including reciprocating type engines could utilize the invention especially those engines with exhaust temperatures sufficient to increase the compressed air temperature above that required to sustain the catalytic reaction. The temperature of the catalytic reaction will depend on the combination of the endothermic catalyst 84 and exothermic catalyst 80 used.

In the mixing chamber 20, fuel is introduced into the heated compressed air. Fuel stored in the reservoir 38 is pressurized by the fuel pump 40. In the preferred embodiment, the fuel injector 44 introduces the pressurized fuel into the mixing chamber 20. Preferably the fuel is in the form of a liquid vapor, gas, or atomized spray. These forms insure a generally homogeneous mixture of fuel and air prior to entering the catalytic reactor 22. With liquid fuel, the fuel pump 40 coupled with the fuel injector 44 atomizes the fuel as it exits from the plurality of spokes 46. The atomized fuel and heated compressed air form the fuel/air mixture. In the preferred embodiment, mixers 48 in the mixing chamber 20 assist mixing of the fuel and air in any conventional manner without incurring significant pressure losses in the fuel/air mixture.

The fuel/air mixture leaving the mixing chamber 20 enters the catalytic reactor 22. In the preferred embodiment, the exothermic catalyst 80, palladium with the first washcoat 82 being $ZrO_2$, promotes a chemical reaction where the fuel/air mixture is partially oxidized. The following example shows the partial oxidation of methane:

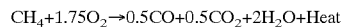
$$CH_4 + 1.75O_2 \rightarrow 0.5CO + 0.5CO_2 + 2H_2O + \text{Heat}$$

where the heat generated in this reaction is 157.9 kcal/mole. The exothermic catalyst 80 coats the first side 72 of the substrate 66. The heat from the above reaction is conducted through the substrate 66 to the second side 74 of the substrate 66 to the endothermic catalyst 84. The nickel based endothermic catalyst 84 promotes the cracking of low octane hydrocarbon chains into high octane easily combustible hydrocarbon chains and hydrogen. The following example shows the catalytic cracking of liquid fuel:

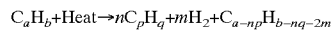
$$C_aH_b + \text{Heat} \rightarrow nC_pH_q + mH_2 + C_{a-np}H_{b-nq-2m}$$

as an example of a general reaction. A portion of the fuel/air mixture is passed on both the first side 76 and the second side 78 of the substrate 66. Using both the endothermic catalyst 84 and the exothermic catalyst 80 reduces the temperature of the substrate 66. Heat generated in the catalytic combustion is used to form the reformulated fuel/gas mixture instead of heating the substrate 66. In the preferred embodiment, the life of the substrate 66 is extended by keeping temperatures of the substrate below 1850 degrees F. (1010 degrees C.).

Using the corrugated foils 70 increases interaction between the fuel/air mixture and the respective catalyst 80,84 while not greatly increasing the pressure loss through the catalytic reactor 22. Increasing interaction between the catalysts 80, 84 and the fuel/air mixture within the catalytic reactor 22 promotes more complete reaction of the fuel/air mixture. The application of the first washcoat 82 to the first side 76 of the substrate 66 and the second washcoat 86 to the second side 78 of the catalytic reactor 22 further increases interaction between the fuel/air mixture and the respective catalysts 80, 84.

The network of longitudinal passages 68' further enhances interaction between the respective catalysts 80, 84 and the fuel/air mixture. By making the network of longitudinal passages 68' serpentine, the catalytic reactor may be more compact while achieving the same performance possible with the network of longitudinal passages 68 shown in FIG. 4a.

Selection of substrate 66 materials further enhances effectiveness of the catalytic reactor 22 by increasing heat transfer between the first side 72 and the second side 74. Selecting metal alloys with high conductivity further reduces the resistance to heat transfer between the first side 72 and the second side 74. In the preferred embodiment the aluminum/chromium-containing steel substrate 66 material provides high thermal conductivity, corrosion resistance, and strength.

The products resulting from reacting the fuel/air mixture on the second side are the reformulated fuel/gas mixture in the following reaction as only an example from burning a gaseous fuel:

$$CH_4 + H_2O \leftrightharpoons CO + 3H_2$$

In the preferred embodiment, this reaction occurs at temperatures ranging from 650–1500° F. (343–816° C.) and requires 49.3 kcal/mole. In another example, the products resulting from the cracking of liquid fuel on the second side coated with an endothermic catalyst follow the reaction:

$$C_{10}H_{22} \rightarrow 5C_2H_4 + H_2$$

In the preferred embodiment, this reaction occurs at temperatures around 800° F. (427° C.) and requires 122.2 kcal/mole. The reformulated fuel/gas mixture may be ignited at much lower temperatures than the original fuel/air mixture.

In one of the alternative embodiments, the volume of dilution air introduced near the combustor 24 from the dilution air conduit 112 may be increased after reformulating the fuel/air mixture into the fuel gas mixture. Increasing the volume of dilution air reduces the rate of combustion and limits the temperatures of combustion. Having lower ignition temperatures allows introduction of more dilution air into the combustor 24 without completely quenching the combustion.

The catalytic reactor 22 makes it possible to use many of the same engine 10 components regardless of the fuel being used. The compressor 14 and the recuperator 16 are generally independent of fuel. The combustor 24 and the turbine 26 operate based on the reformulated fuel/gas mixture exiting the catalytic reactor 22 which may be controlled to be nearly the same for all hydrocarbon fuels introduced into the inlet 50 of the catalytic reactor 22.

What is claimed is:

1. An internal combustion engine for promoting reduced emissions, said internal combustion engine comprising:
    a combustion chamber having an inlet and an outlet; and
    a catalytic reactor including:
        a housing having an inlet and an outlet, said outlet of said housing being connected with said inlet of said combustor;
        a thermally conductive substrate positioned within said housing, said substrate having a first side and a second side, said substrate defining a first longitudinal passage and a second longitudinal passage;
        an exothermic catalyst coating said first side, wherein said exothermic catalyst at least partially oxidizing a hydrocarbon fuel, said oxidizing generating heat and a first catalytic exhaust mixture; and
        an endothermic catalyst coating said second side, wherein said endothermic catalyst cracking said hydrocarbon fuel, said cracking forming a second catalytic exhaust mixture; and
        a means for mixing said first catalytic exhaust mixture and said second catalytic exhaust mixture to form a combustible gas.

2. The internal combustion engine as specified in claim 1, wherein said exothermic catalyst selected from the group consisting of palladium or other platinum group metals.

3. The internal combustion engine as specified in claim 1, wherein said substrate is a metallic foil.

4. The internal combustion engine as specified in claim 3, wherein said metallic foil being selected from the group consisting of iron, chromium, aluminum or alloys thereof.

5. The internal combustion engine as specified in claim 1, wherein said substrate is corrugated.

6. The internal combustion engine as specified in claim 1, wherein said endothermic catalyst selected from the group consisting of nickel, chromium, iridium, ruthenium, rhodium, or other transition metals.

7. The internal combustion engine as specified in claim 1, wherein said first longitudinal passages and said second longitudinal passages are serpentine.

8. The internal combustion engine as specified in claim 5, wherein said substrate is a plurality of metallic foils.

* * * * *